US012625929B2

(12) United States Patent
Grover et al.

(10) Patent No.: US 12,625,929 B2
(45) Date of Patent: May 12, 2026

(54) STORING WATERMARKS IN A SOFTWARE IMAGE

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 146 days.

(21) Appl. No.: 18/126,216

(22) Filed: Mar. 24, 2023

(65) Prior Publication Data

US 2024/0320309 A1    Sep. 26, 2024

(51) Int. Cl.
 *G06F 21/16*     (2013.01)
 *G06F 21/10*     (2013.01)
(52) U.S. Cl.
 CPC .......... *G06F 21/16* (2013.01); *G06F 21/1063* (2023.08)
(58) Field of Classification Search
 CPC . G06F 21/16; G06F 21/1063; H04L 2209/608
 See application file for complete search history.

(56) References Cited

U.S. PATENT DOCUMENTS

| | | | |
|---|---|---|---|
| 10,990,706 B2 | 4/2021 | Robison | |
| 11,409,787 B2 | 8/2022 | Chen | |
| 2004/0172544 A1* | 9/2004 | Luo ....................... | G06F 21/125 |
| | | | 713/189 |
| 2005/0246549 A1* | 11/2005 | Torrubia-Saez ........ | H04L 63/10 |
| | | | 713/182 |
| 2021/0397715 A1* | 12/2021 | Duval ..................... | G06F 21/57 |
| 2022/0179931 A1* | 6/2022 | Levacher ................ | G06F 21/16 |

FOREIGN PATENT DOCUMENTS

| | | |
|---|---|---|
| EP | 3937039 A1 | 1/2022 |
| IN | 201941012649 A | 10/2020 |

OTHER PUBLICATIONS

Y. Su, X. Liao, H. Jin and T. Bell, "Data Hiding in Virtual Machine Disk Images," 2010 10th IEEE International Conference on Computer and Information Technology, Bradford, UK, 2010, pp. 2278-2283 (Year: 2010).*
Tadano, Kumiko, et al. "Digital watermarking of virtual machine images." Advances in Digital Forensics VI: Sixth IFIP WG 11.9 International Conference on Digital Forensics, Hong Kong, China, Jan. 4-6, 2010, Revised Selected Papers 6. Springer Berlin Heidelberg, 2010. (Year: 2010).*

* cited by examiner

*Primary Examiner* — Han Yang
(74) *Attorney, Agent, or Firm* — Sheridan Ross P.C.

(57)    ABSTRACT
One or more unused locations in a software image are identified. An example of a software image may be a container image or virtual machine image. An unused location may be a location where padding is used in the software image. A first watermark is placed in the one or more unused locations to produce a watermarked software image. A request is received to load the watermarked software image. In response to receiving the request to load the watermarked software image, a second watermark is generated using the one or more unused locations in the watermarked software image and the second watermark is then compared to the first watermark. In response to the first watermark matching the second watermark, the software image is loaded. In response to the first watermark not matching the second watermark, the software image is not loaded.

20 Claims, 7 Drawing Sheets

User 100
101
Computing Device
102
Microprocessor(s)
103
Operating System
104
Loader/Unloader
105
Watermark Manager
106
Software Image(s)
107
Watermark(s)
108
Hypervisor

100

101 Computing Device

102 Microprocessor(s)

103 Operating System

104 Loader/Unloader

105 Watermark Manager

106 Software Image(s)

107 Watermark(s)

108 Hypervisor

109 User

STORING WATERMARKS IN A SOFTWARE IMAGE

FIELD

The disclosure relates generally to protection of software images and particularly to the protection of software images from tampering using watermarks.

BACKGROUND

One of the problems with containers/Virtual Machines (VMs)/software applications is that their images can be compromised. For example, someone may insert malware into an existing virtual machine image. When the image is loaded, the malware then becomes active. There are currently several solutions to solve this, such as, using a hash to validate the container/VM image, using mirror images, and encrypting the container/VM image. While these solutions do provide a significant benefit, malicious parties have still been able to defeat these solutions. What is needed is a solution that is not obvious to a malicious party and/or can be used in conjunction with these solutions to provide enhanced container/VM image protection.

SUMMARY

These and other needs are addressed by the various embodiments and configurations of the present disclosure. The present disclosure can provide a number of advantages depending on the particular configuration. These and other advantages will be apparent from the disclosure contained herein.

One or more unused locations in a software image are identified. An example of a software image may be a container image or virtual machine image. An unused location may be a location where padding is used in the software image. A first watermark is placed in the one or more unused locations to produce a watermarked software image. A request is received to load the watermarked software image. In response to receiving the request to load the watermarked software image, a second watermark is generated using the one or more unused locations in the watermarked software image and the second watermark is then compared to the first watermark. In response to the first watermark matching the second watermark, the software image is loaded. In response to the first watermark not matching the second watermark, the software image is not loaded.

The phrases "at least one", "one or more", "or," and "and/or" are open-ended expressions that are both conjunctive and disjunctive in operation. For example, each of the expressions "at least one of A, B and C", "at least one of A, B, or C", "one or more of A. B. and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"). "one or more" and "at least one" can be used interchangeably herein. It is also to be noted that the terms "comprising," "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, when comparing a watermark to a watermark read from a watermarked software image may include where the watermarked software image has been replaced by a software image without a watermark.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
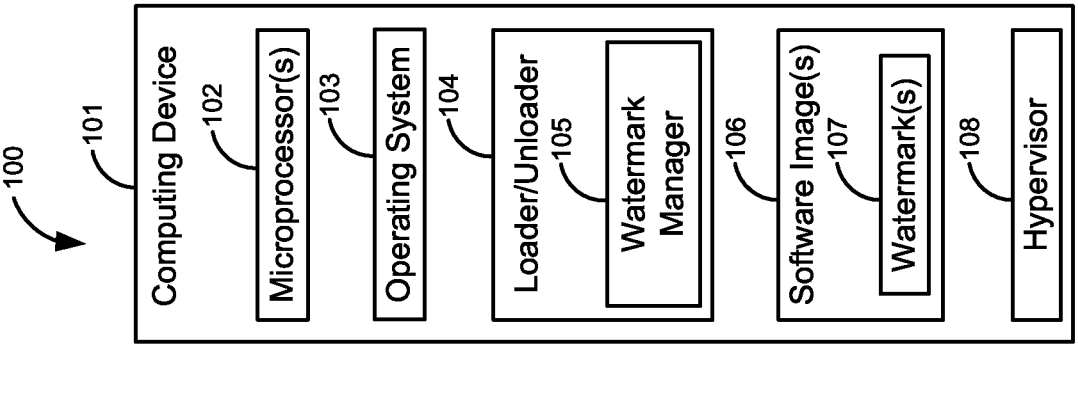
FIG. 1 is a block diagram of a first illustrative system for generating and storing watermark(s) in a software image on a computing device.

FIG. 1 is a block diagram of a first illustrative system 100 for generating and storing watermark(s) 107 in a software image 106 on a computing device 101. The first illustrative system 100 comprises a computing device 101. In addition, a user 109 is shown for convenience.

The computing device 101 can be or may include any device that can load and execute software, such as a Personal Computer (PC), a telephone, a video system, a cellular telephone, a Personal Digital Assistant (PDA), a tablet device, a notebook device, a smartphone, a server, an application server, a web server, and/or the like. The computing device 101 further comprises a microprocessor(s) 102, an operating system 103, a loader/unloader 104, software image(s) 106, and a hypervisor 108.

The microprocessor(s) 102 may be any hardware microprocessor, such as, a Complex Instruction Set Computer (CISC), a Reduced Instruction Set Computer (RISC), an Application Specific Computer (ASIC), a superscalar computer, and/or the like. The microprocessor 102 may be provided by various vendors, such as Intel® (e.g., an X86 processor), Advanced Micro Devices® (AMD), Motorola®, Texas Instruments®, and/or the like. The microprocessor(s)

102 may be a multi-core processor, a plurality of microprocessors 102, or a single microprocessor 102.

The operating system 103 may be any type of operating system, such as, Linux®, Microsoft Windows®, iOS®, Android®, Apple macOS®, and/or the like. The operating system 103 uses the loader/unloader 104 to load, execute, and unload the software images 106. The operating system 103 may comprise multiple operating systems 103 or images of an operating system 103. For example, each virtual machine image (a software image 106) may have its own operating system 103. The operating system 103 may comprise multiple different operating systems 103.

The loader/unloader 104 can be any firmware/software coupled with hardware that can be used to load and execute a software image 106. The loader/unloader 104 may be part of a hypervisor 108 that loads/unloads virtual machines and/or containers/micro services. The loader/unloader 104 comprises a watermark manager 105.

The watermark manager 105 is used to determine how to add and verify watermark(s) 107 in the software image(s) 106. The watermark manager 105 may use various rules/algorithms to generate the watermark(s) 107 and verify the watermark(s) 107 in the software image 106. The watermark manager 105 may determine various unused location(s) in the software image 106 to place the one or more watermarks 107 and/or portions of watermark(s). The watermark manager 105 may reside outside of the loader/unloader 104.

A software image 106 may comprise a container image (e.g., a Docker image), a virtual machine image, a software application, a micro service, an executable, and/or the like. The software image 106 may comprise multiple components/libraries. The software image 106 may comprise multiple applications in a virtualized environment (e.g., where the software image 106 is an image of a virtual machine or container). The software image 106 may include the operating system 103 (e.g., a virtual machine that has its own operating system 103).

The software image(s) 106 further comprises the watermark(s) 107. The watermark(s) 107 may be any type of watermark 107 that can be placed into the software image 106 to validate that the software image 106 contains the watermark 107.

The hypervisor 108 can be or may include any type of hypervisor 108, such as, a bare metal hypervisor 108, a hosted hypervisor 108, and/or the like. The hypervisor 108 may load a software image 106 (e.g., a container/virtual machine/micro service) in a virtualized environment. In this example, the loader/unloader 104 is part of the hypervisor 108.

The user 109 can be any user/person who can access the computing device 101. The user 109 may use the software images 106. For example, the software image 106 may be a software application that is loaded and running on the computing device 101.

Figure 2:
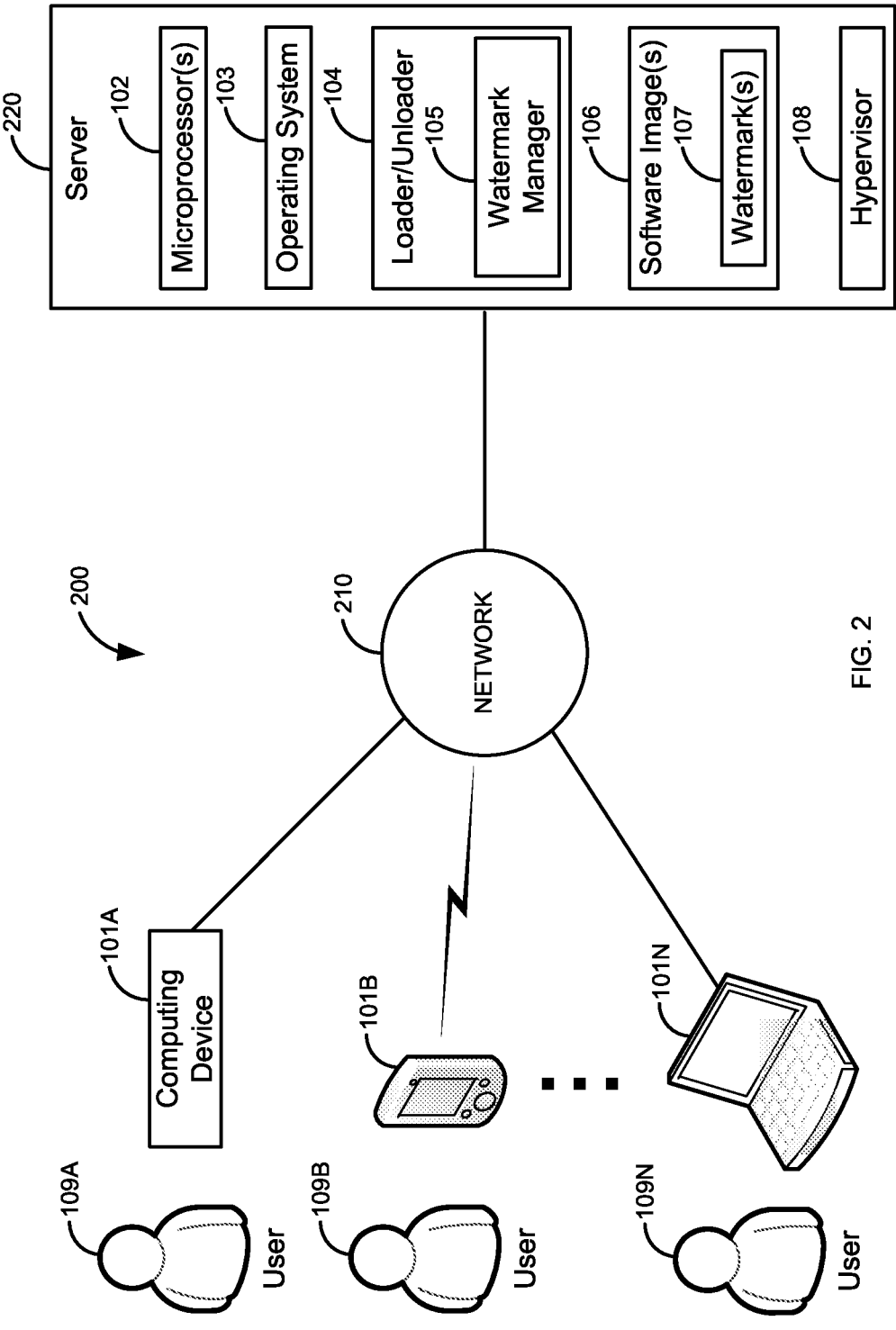
FIG. 2 is a block diagram of a second illustrative system for generating and storing watermark(s) in a software image on a server.

FIG. 2 is a block diagram of a second illustrative system 200 for generating and storing watermark(s) 107 in a software image 106 on a server 220. The second illustrative system 200 comprises computing devices 101A-101N, a network 210, and the server 220.

The computing devices 101A-101N may be similar to the computing device 101 of FIG. 1. The computing devices 101A-101N are used by the users 109A-109N to access services provided by the software image(s) 106 when the software image(s) 106 are loaded and are executing. For example, the software image 106 may be a web application that is running in a virtual machine that is part of a cloud service provided by the server 220.

The network 210 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 210 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The server 220 further comprises the microprocessor(s) 102, the operating system 103, the loader/unloader 104, the watermark manager 105, the software image(s) 106, the watermark(s) 107, and the hypervisor 108. The microprocessor(s) 102, the operating system 103, the loader/unloader 104, the watermark manager 105, the software image(s) 106, the watermark(s) 107, and the hypervisor 108 work similar those described in FIG. 1. The primary difference between FIG. 1 and FIG. 2 is that the software image(s) 106 provide services via the network 210. For example, the services may be for a security application that is provided to the users 109A-109N via the network 210 as a web service.

Figure 3:
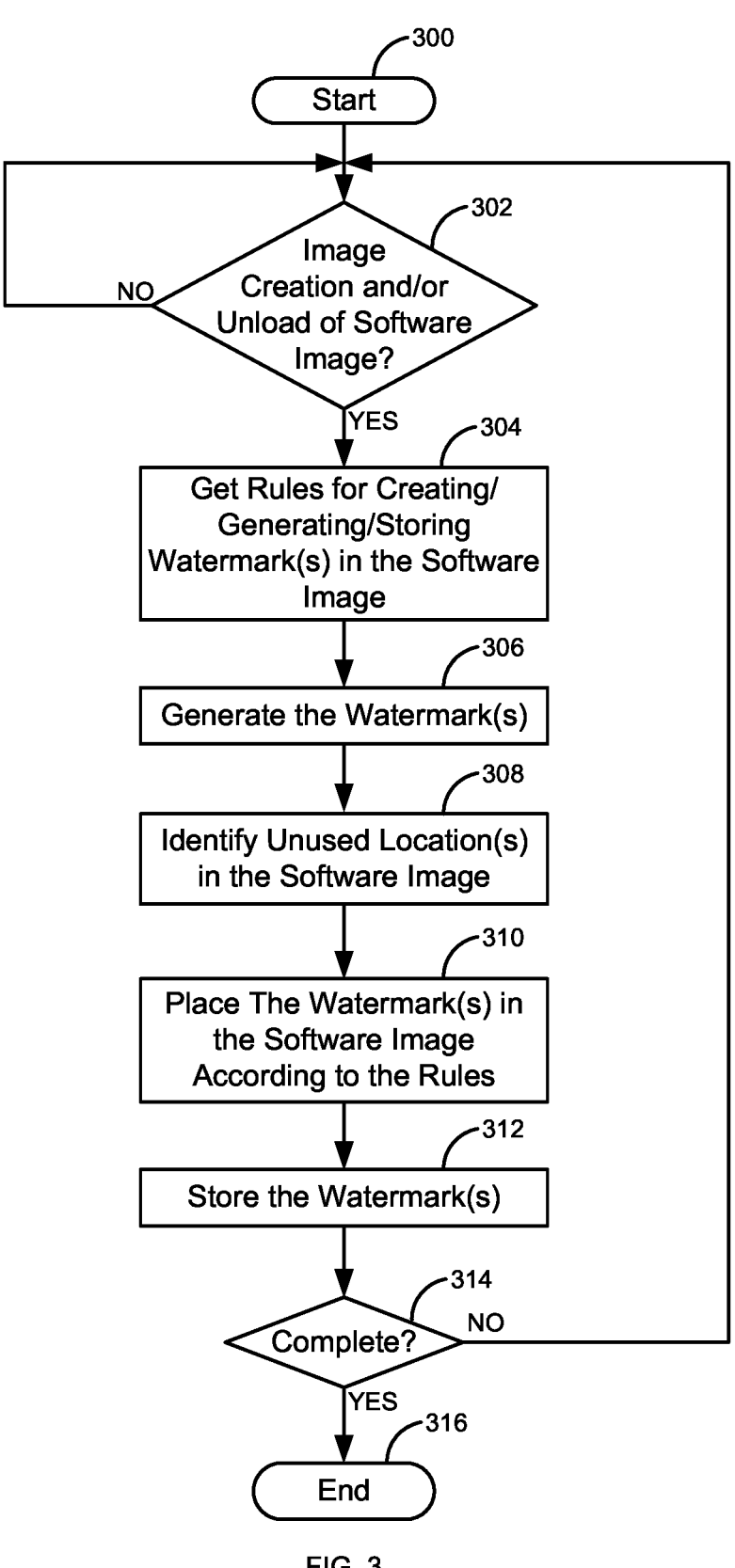
FIG. 3 is a flow diagram of a process generating and storing watermark(s) in a software image.

FIG. 3 is a flow diagram of a process generating and storing watermark(s) 107 in a software image 106. Illustratively, the microprocessor(s) 102, the operating system 103, the loader/unloader 104, the watermark manager 105, the software image(s) 106, the watermark(s) 107, and the hypervisor 108 are stored-program-controlled entities, such as a computer or microprocessor 102, which performs the methods of FIGS. 3-7 and the processes described herein by executing program instructions stored in a computer readable storage medium, such as a memory (i.e., a computer memory, a hard disk, and/or the like). Although the methods described in FIGS. 3-7 are shown in a specific order, one of skill in the art would recognize that the steps in FIGS. 3-7 may be implemented in different orders and/or be implemented in a multi-threaded environment. Moreover, various steps may be omitted or added based on implementation.

The process starts in step 300. The watermark manager 105 determines, in step 302, if a software image 106 has been created and/or unloaded. If the software image 106 has not been created or unloaded in step 302, the process of step 302 repeats. Otherwise, if the software image 106 has been created and/or unloaded in step 302, the watermark manager 105 gets rules for creating/generating/storing watermarks 107 in the software image 106 in step 304.

The rules may define specific software images 106 that will have the watermark(s) 107. For example, the watermark(s) 107 may be assigned based on a tenant basis (e.g., in a cloud service), based on type of virtual machine, container, application, etc., based on an administration, based on a type of service provided by the software image 106 (e.g., the software image 106 is a security application), and/or the like. The rules may define specific types of watermark(s) 107 to be used, such as, a forward hash of the software image 106, a reverse hash of the software image 106, a transparent bit code (similar to stenography), based on a record or pointer that is used to determine that a layout of the software image 106 has not changed, and/or the like. For example, the watermark 107 could be based on a representation of a file descriptor table in the software image 106 that represents a layout of the software image 106.

Examination of the system, and comparing the system to the watermark 107 may enable the watermark manager 105 to determine the software image's state (i.e. modified or not modified). Another use of the watermark(s) 107 would be to determine, not only the location of components, but to determine an execution order of the components within software image 106. Thus the software image 106 and the start-up execution could be examined for changes in determining whether to load or not load the software image 106. A number of items could be included in the watermark 107 including format, types of service, hash values of elements or configuration, size, layout index into the virtual environment and associated blocks. In addition, the watermark(s) 107 may be based on block pointers.

The watermark 107 may comprise multiple watermarks 107. For example, two different hashes may be generated using two different hashing algorithms and the two watermarks 107 are stored separately in the software image 106 (in different unused locations or the same unused location and/or divided into portions). The watermarks 107 may be different types of watermarks 107. For example, the watermarks 107 may comprise two or more of any type of watermarks 107 described herein.

The watermark(s) 107 are generated, by the watermark manager 105, in step 306, based on the rules. The watermark manager 105 identifies, in step 308, any unused location(s) in the software image 106. An unused location may comprise any memory location within the software image 106 that is not used or not initially used by the software image 106. This may include uninitialized locations that are overwritten when the software image 106 is loaded and/or executed. For example, stack space in the software image 106 may be overwritten when a container is loaded and then executed. Examples of unused space in the software image 106 may include white space of the software image 106, non-initialized data segments, stack space, heap space, padding and/or the like. Step 308 may occur each time or may only occur when the software image 106 is initially created or changed.

The rules may include digitally signing the watermark 107. Thus the watermark can be verified because the watermark is signed.

For example, when the software image 106 is created, the software image 106 and/or file system for the software image 106 is padded to an even memory boundary (e.g., based on 128-bit boundaries) and memory is allocated for execution of the programs and or processes within the software image 106. The watermark manager 105 can look at the size of memory for either of these and insert the watermark(s) 107 in the padded area. Alternatively in a virtual machine environment, the hard drive is a fixed allocated space. Hence, it is possible to mark a block in the file system as bad (same code executing in VM world as real world)—which would then ignore anything but direct accesses to it. The space marked as bad can be used to place one or more watermark(s) 107 and/or portions of watermark(s) 107.

In one embodiment, the unused locations may be learned after runtime or from code scanning. For example, a stack size may be determined by scanning the code of the software image 106.

The watermark(s) 107 are placed in the software image 106 according to rules in step 310. The watermark(s) 107 may be placed into the software image 106 when the software image 106 is initially created and then it is stored off when the software image 106 is unloaded. The watermark(s) 107 and/or portions of the watermark(s) 107 may be spread over different parts of the software image 106 where the unused location(s) reside. The watermark 107 may be a checksum of the software image 106, a hash of the software image 106, a cyclic redundancy check of the software image 106, a random number, an encrypted hash of the software image 106, an encrypted checksum of the software image 106, an encrypted cyclic redundancy check of the software image 106, a token of a hash/checksum/cyclic redundancy check (e.g., where the token has a corresponding hash of the software image 106 that is stored in a tokenization table), and/or the like. For example, the hash/checksum/cyclic redundancy check may be a hash/checksum/cyclic redundancy check generated based on the software image 106. The hash/checksum/cyclic redundancy check may be able to deal with the unused locations that the watermark 107 was added to by setting the unused locations where the watermark 107 is stored to a fixed value (e.g., zeros) and then validating the watermark 107 if it is a hash/checksum/cyclic redundancy check.

The watermark(s) 107 could be used for trusted startup. The watermark(s) 107 could also be used to record legitimate changes through the life of a virtual machine/container. For example, as the software image 106 of the virtual machine changes (e.g., a new application is added to a virtual machine), a new watermark 107 is placed in the new version. In one embodiment, the watermark 107 may be dynamic—that is, it changes each time the software image 106 is stored (e.g., the watermark 107 is a random number). In this example, the hypervisor 108 and/or loader/unloader 104 can keep track of the changes. The watermarks 107 may be used to show times where the software image 106 has changed.

By placing the watermark(s) 107 in the unused location(s) in the software image 106, the size of the software image 106 does not change. This is advantageous over existing schemes that add to the size of the software image 106.

The watermark(s) 107 are then stored off for later use, in step 312. The stored off watermark(s) 107 are used to validate that the watermarks 107 that are in the software image 106 when the software image 106 loads the next time as described in FIG. 4.

The watermark manager 105 determines, in step 314, if the process is complete. If the process is not complete in step 314, the process goes back to step 302. Otherwise, if the process is complete in step 314, the process ends in step 316.

Figure 4:
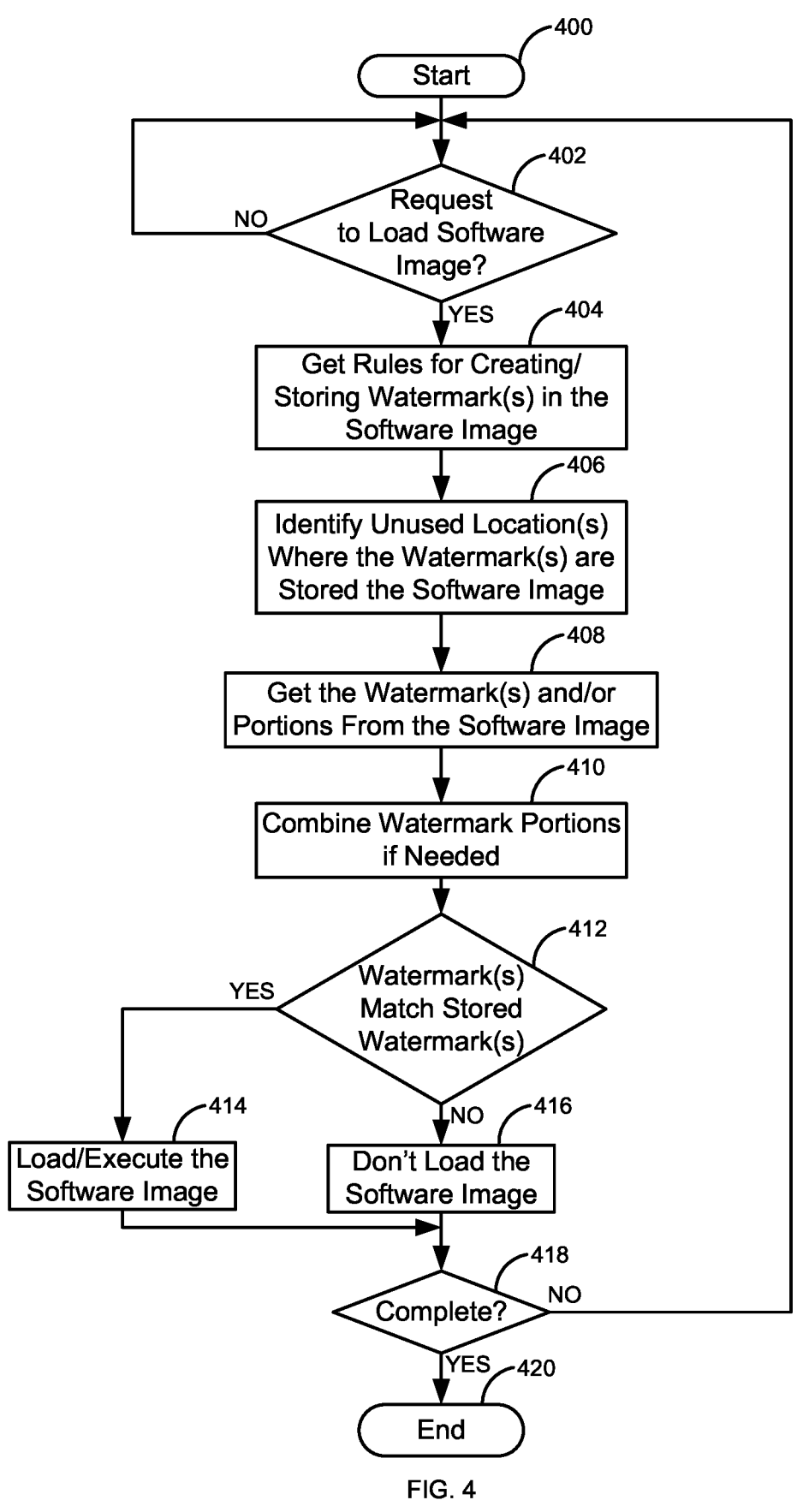
FIG. 4 is a flow diagram of a process for determining if a software image has a watermark.

FIG. 4 is a flow diagram of a process for determining if a software image 106 has a watermark 107. The process starts in step 400. The watermark manager 105 determines, in step 402, if a request to load a software image 106 has been received. If a request to load a software image 106 has not been received in step 402, the process of step 402 repeats.

Otherwise, if a request to load a software image 106 has been received in step 402, the watermark manager 105 gets, in step 404, the rules for creating/storing the watermark(s) 107 in the software image 106 (e.g., the rules used in step 304). If the rules indicate that the software image 106 has watermark(s) 107, the watermark manager 105 identifies, in step 406, the unused location(s) where the watermark(s) 107 are stored in the software image 106 (i.e., the identified unused locations of step 308).

The watermark manager 105 gets, in step 408, the watermark(s) 107 and/or portions of the watermark(s) 107 from the unused location(s) in the software image 106 based on how the watermark(s) 107 were stored in the software image 106. The watermark manager 105 combines the portions of watermarks 107 to generate the watermark(s) 107 in step 410 if needed.

The watermark manager 105 compares the watermark(s) 107 from the software image 106 to the watermark(s) 107 stored off in step 312 to see if they match. If the compared watermark(s) 107 match, in step 412, the software image 106 is loaded and executed in step 414 and the process goes to step 418. Otherwise, if the compared watermark(s) 107 do not match in step 412, the software image 106 is not loaded in step 416 and the process goes to step 418. Step 416 may also include sending a notification to the user 109 indicating that there was a watermark failure. In addition, step 416 may also include storing information about the watermark failure in a log.

The matching of step 412 may comprise additional steps, such as, validating a load sequence based on the watermark(s) 107, validating a hash of the software image 106, checking a checksum of the software image 106, checking an encrypted hash stored in the software image 106, validating a hash from a tokenization table (where the token is the watermark 107 that is used to lookup the actual hash of the software image 106), validating file locations for the software image 106, and/or the like. For example, if the watermark 107 is a hash of the software image 106, the comparison step 412 may include validating if the software image 106 that is to be loaded matches the hash watermark 107. In this example, the comparison step also prevents someone replacing the software image 106 with a software image 106 that may contain some type of malware because the compromised software image 106 would not have the watermark 107. Even if it did, the hash of the software image 106 would not match the hash watermark 107. This check would prevent loading of a compromised software image 106. If the hash were tokenized (replaced by a token used to get the hash), this would prevent anyone from determining the actual hashing algorithm, which will further protect the software image 106 from being compromised.

The watermark manager 105 determines, in step 418, if the process is complete. If the process is not complete in step 418, the process goes back to step 402. Otherwise, if the process is complete in step 418, the process ends in step 420.

Figure 5:
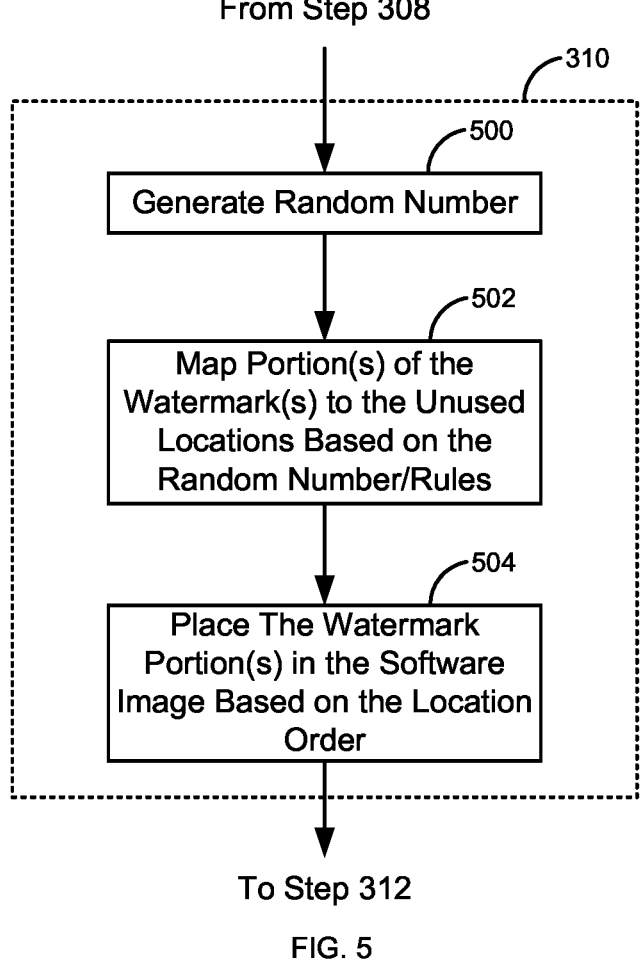
FIG. 5 is a flow diagram of a process for determining where to place watermark(s) in a software image based on a random number.
Figure 6:
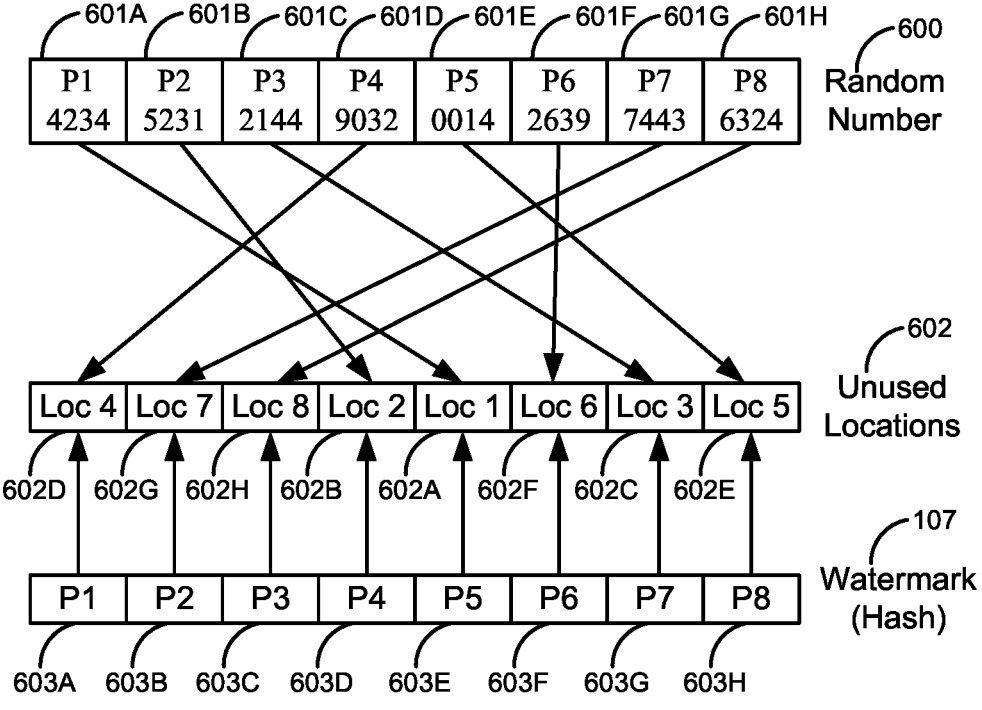
FIG. 6 is a diagram of a process for using a random number to determine an order of unused locations for storing a watermark.

FIG. 5 is a flow diagram of a process for determining where to place watermarks 107 in a software image 106 based on a random number 600. The process of FIG. 5 is described using an exemplary embodiment shown in FIG. 6. FIG. 6 shows the random number 600 that has eight random number portions 601A-601H, eight unused locations 602A-602H, and a watermark 107 that has eight watermark portions 603A-603H.

After identifying the unused location(s) 602A-602H in the software image 106 in step 308, the watermark manager 105 generates a random 600 number in step 500. The watermark manager 105 maps the watermark portions 603A-603H of the watermark(s) 107 to the unused locations 602A-602H based on the random number portions 601A-601H/rules in step 502.

To illustrate using FIG. 6, the generated random number 600 has a value of 42345231214490320014263974436324. The random number 600 is divided into the eight random number portions 601A-601H. In this exemplary embodiment, the value of each random number portion 601 is used to determine a location order. Here, the random number portion 601D with the highest value (9032) maps to unused location 602D (unused location 4), which is the first unused location 602D to be used in the location order. A similar process is used for the next highest random number portion 601G (7443) that maps to the second unused location 602G to be written and so on until the lowest random number portion 601E (0014) that maps to the last unused location 602E (location 5). Thus, the order of unused locations is 602D, 602G, 602H, 602B, 602A, 602F, 602C, and 602E. If two or more of the random number portions 601 have the same value, the first random number portion 601 maps to the earlier unused location 602 and the second random number position 601 map to the next unused location 602 and so on. The watermark 107 (in this example a hash), then maps based on the order of the unused locations 602. Here, the watermark portion 603A maps to the unused location 602D. The watermark portion 603B maps to the unused location 602G and so on until the watermark position 603H maps to the unused location 602E. Thus, each time the random number 600 is generated, a new order of unused locations 602 is created for storing the watermark portions 603A-603H.

The watermark manager 105 places the watermark portions 603A-603H in the software image 106 based on the location order in step 504. The process then goes to step 312 where the watermark(s) 107 are stored in the software image 106. When reading the watermark(s) 107 from the software image 106, a reverse process is used. For example, in step 410, a reverse process may be used to combine the watermark portions (603A-603H) to produce the watermark 107.

While the process described in FIG. 6 uses the highest number in the random number portions 601A-601H to map the unused locations 602A-602H, a lowest number of the random number portions 601 may be used for the first unused location 602 and so on until the highest number. In addition, different sizes of portions 601/603 may be used and/or different watermark(s) 107. This process may be used for multiple watermarks 107. For example, a forward and a reverse hash may be stored as watermark portions 603 in the software image 106.

While FIG. 6 shows that the location order is determined by the random number 600, which unused locations 602 that are used may be determined based on the rules/random number 600. For example, there may be one hundred unused locations 602 and the watermark portions 603 may be eight portions 603A-603H (like shown in FIG. 6). In this case, the random number 600 may be used to determine which eight of the one hundred unused locations 602 may be used to store the watermark portions 603A-603H. For example, a number range may be associated with a unused location 602. If there is overlap, the next range may be selected for the next watermark portion 603.

Figure 7:
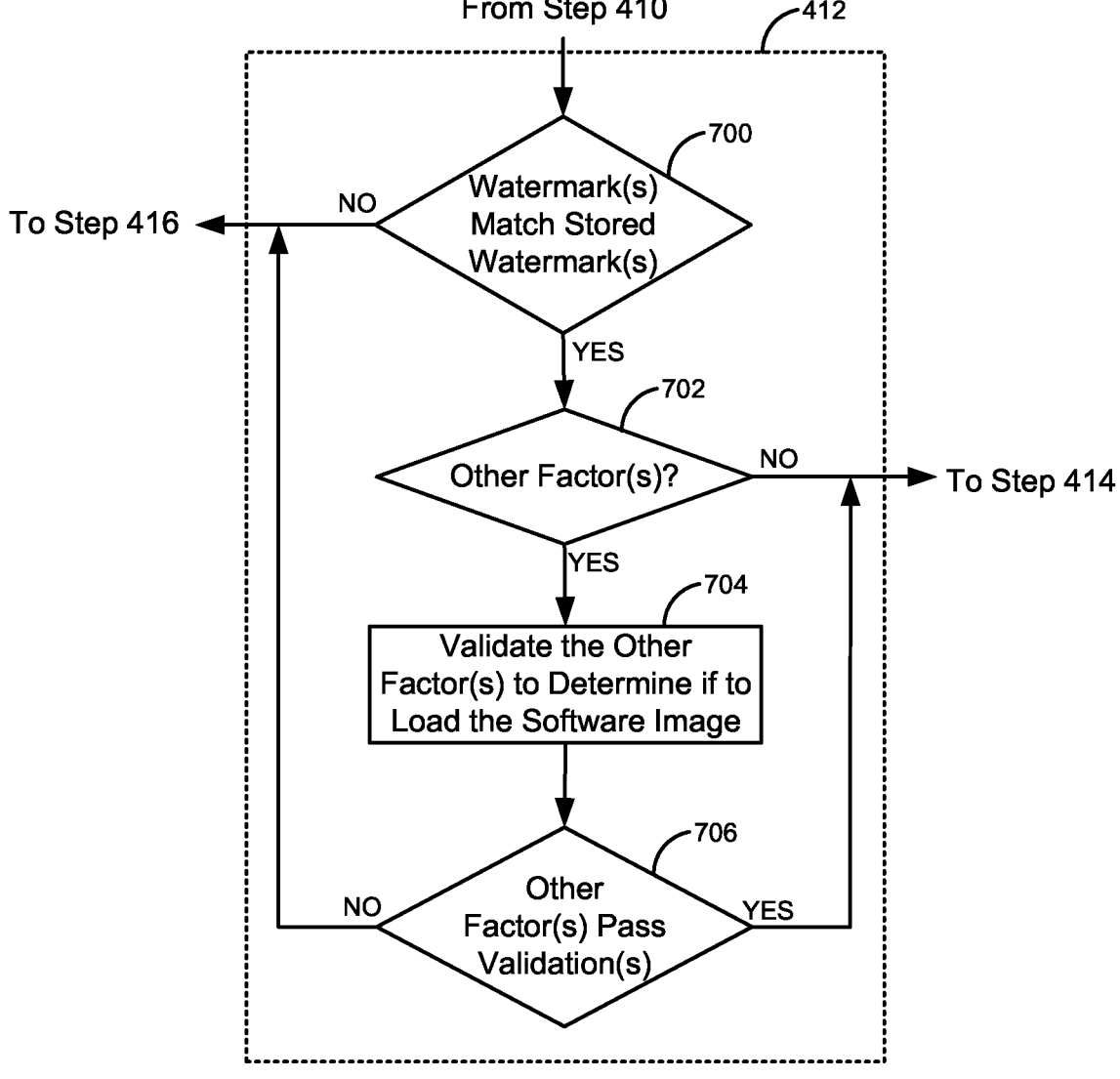
FIG. 7 is a flow diagram of a process for using additional factors to determine if a software image is to be loaded.

FIG. 7 is a flow diagram of a process for using additional factors to determine if a software image 106 is to be loaded. After combining the watermark portions 603A-603H if needed in step 410, the watermark manager 105 determines, in step 700, if the watermark(s) 107 from the software image 106 match the stored watermark(s) 107. If the watermark(s) 107 from the software image 106 does not match the stored watermark(s) 107 in step 700, the process goes to step 416 where the software image 106 is not loaded.

Otherwise, if the watermark(s) 107 from the software image 106 match the stored watermark(s) 107 in step 700, the watermark manager 105 determines, in step 702 if other factors need to be validated into order to load and execute the software image 106. If other factors do not need to be validated in step 702, the process goes to step 414 where the software image 106 is loaded and executed.

Otherwise, if there are other factor(s) to be validated in step 702, the watermark manager 105, validates the other factor(s) in step 704. The other factors may be any factor that is used to help determine if the software image 106 is to be loaded and executed. For example, another factor may be to validate a load sequence of the software image 106 where the watermark 107 is based on the load sequence of the software image 106. Another embodiment may be where the software image 106 is hashed to generate a hash of the software image 106 and then the hash is compared to the first watermark 107 (where the watermark 107 is a second hash of the software image 106). A similar process may be used for a checksum or cycle redundancy check. For example, a generated checksum of the software image 106 is compared to the watermark 107 (where the watermark 107 is also checksum of the software image 106). In another embodiment, a hash of the software image 106 is based on a token (which is stored in a tokenization table). The tokenization table has a hash of the software image 106 where the token is used to lookup the hash. The hash in the tokenization table is compared to a generated hash of the software image 106 to determine if the software image 106 has been compromised. Another factor may be to validate one or more file locations for the software image 106 where the watermark 107 is based on the one or more file locations. In addition, an execution order of the software image 106 can be determined and then compared to the watermark 107 where the watermark 107 is based on the execution order of the software image 106 (e.g., the watermark 107 is a hash of the execution order). In another embodiment, locations of files used by the software image are determined and compared to the watermark 107. The watermark 107 is based on the locations of the files used by the software image 106 (e.g., the watermark is a hash of the locations of the files used by the software image 106). The watermark 107 may be digitally signed before it is stored in the software image 106. The watermark 107 is then unsigned to produce the actual watermark 107.

The watermark manager 105 determines, in step 706, if the other factor(s) pass the validation(s). If the other factor(s) pass validation(s) in step 706, the process goes to step 414 where the software image 106 is loaded and executed. Otherwise, if the other factor(s) do not pass the validation(s) in step 706, the process goes to step 416 where the software image 106 is not loaded.

The processes described herein may be used with existing processes to provide enhanced security. For example, the watermark(s) 107 can work where the software image 106 is encrypted. In this case, the watermark(s) 107 are placed in the software image 106 before the software image 106 is encrypted. Thus, not only is the software image 106 protected by the encryption, but also by the watermark(s) 107. These processes could work with systems that also use hash extensions or mirror images for protecting software images 106.

Examples of the processors as described herein may include, but are not limited to, at least one of Qualcomm® Snapdragon® 800 and 801, Qualcomm® Snapdragon® 610 and 615 with 4G LTE Integration and 64-bit computing. Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device 101.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD. PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:

a microprocessor; and a computer readable medium, coupled with the microprocessor and comprising microprocessor readable and executable instructions that, when executed by the microprocessor, cause the microprocessor to:

identify one or more unused locations in a software image;

generate a first watermark based on at least part of the software image;

store the first watermark separately from the software image;

subdivide the first watermark into plural first watermark portions comprising different first and second watermark portions;

place the first watermark portion in a first unused location and the different second watermark portion in a different second unused location to produce a watermarked software image;

receive a request to load the watermarked software image;

in response to receiving the request to load the watermarked software image:

generate a second watermark using at least the first and second unused locations in the watermarked software image; and compare the first watermark stored separately from the software image to the second watermark;

in response to the first watermark matching the second watermark, load the software image; and in response to the first watermark not matching the second watermark, not loading the software image.

2. The system of claim 1, wherein at least one of the first and second unused locations in the software image are overwritten when the software image is loaded and/or executed and wherein the first watermark comprises one or more of a forward hash of the software image, a reverse hash of the software image, a transparent bit code, and based on a record or pointer that determines that a layout of the software image has not changed.

3. The system of claim 1, wherein the first watermark is assigned based on a tenant basis in a cloud service based on one or more of a type of virtual machine, container, application, an administration, and a type of service provided by the software image.

4. The system of claim 1, wherein the microprocessor determines, based on one or more rules, a specific type of watermark to be generated, the specific type of watermark comprising one or more of a forward hash of the software image, a reverse hash of the software image, a transparent bit code, and based on a record or pointer associated with a layout of the software image, the first watermark being the determined specific type of watermark, and wherein the different first and second watermark portions comprise two or more of: one or more hashes, one or more checksums, one or more cyclic redundancy checks, one or more random numbers, one or more encrypted hashes, one or more encrypted checksums, one or more encrypted cyclic redundancy checks, one or more transparent bit codes, and one or more tokens of one or more hashes.

5. The system of claim 1, wherein the first watermark is used to track legitimate changes of the software image through a software image life cycle and wherein the first watermark comprises one or more of format, types of service, hash values of elements, hash values of configuration, size, layout index into a virtual environment, associated blocks, and block pointers.

6. The system of claim 1, wherein the first watermark changes and is updated each time after the software image is unloaded.

7. The system of claim 1, wherein an order of the first and second unused locations is dynamically determined based on a random number and/or a number for first and second unused locations is determined based on the random number.

8. The system of claim 7, wherein different portions of the random number and/or number map to the first and second unused locations.

9. The system of claim 1, wherein the first and second unused locations comprise at least one of: storage space that is marked as a bad block, a protected memory location, and space that is in a file structure as an added set of bits.

10. The system of claim 1, wherein the first and second unused locations comprise one or more of a memory location within the software image that is not used or not initially used by the software image and comprise an uninitialized location that is overwritten when the software image is loaded and/or executed, and wherein the first and second unused locations comprise one or more of white space of the software image, non-initialized data segment, stack space, heap space, and padding.

11. The system of claim 1, wherein in response to receiving the request to load the software image further comprises at least one of:

validating a load sequence of the software image, wherein the first watermark is based on the load sequence of the software image;

hashing the software image to generate a first hash of the software image and comparing the first hash of the software image to the first watermark, wherein the first watermark is a second hash of the software image;

generating a first checksum and/or a first cyclic redundancy check of the software image and comparing the first checksum and/or the first cyclic redundancy check to the first watermark, wherein the first watermark is a second checksum of the software image and/or a second cyclic redundancy check of the software image;

looking up the first hash of the software image based on a token and comparing the first hash to the second hash of the software image, wherein the token is the first watermark;

determining an execution order of the software image and comparing the execution order of the software image to the first watermark, wherein the first watermark is based on the execution order of the software image;

determining locations of files used by the software image and comparing the locations of the files used by the software image to the first watermark, wherein the first watermark is based on the locations of the files used by the software image; and unsigning the first watermark, wherein the first watermark is signed using a digital signature.

12. A method comprising:

identifying, by a microprocessor, one or more unused locations in a software image;

determining, by the microprocessor based on one or more rules, a specific type of watermark to be generated, the specific type of watermark comprising one or more of a forward hash of the software image, a reverse hash of the software image, a transparent bit code, and based on a record or pointer associated with a layout of the software image;

generating, by the microprocessor, a first watermark based on at least part of the software image, the first watermark being the determined specific type of watermark;

storing, by the microprocessor, the first watermark separately from the software image;

subdividing, by the microprocessor, the first watermark into plural first watermark portions comprising different first and second watermark portions;

placing, by the microprocessor, the first watermark portion in a first unused location and the different second watermark portion in a different second unused location to produce a watermarked software image;

receiving, by the microprocessor, a request to load the watermarked software image;

in response to receiving the request to load the watermarked software image:

generating, by the microprocessor, a second watermark using at least the first and second unused locations in the watermarked software image; and comparing, by the microprocessor, the first watermark stored separately from the software image to the second watermark;

in response to the first watermark matching the second watermark, loading, by the microprocessor, the software image; and in response to the first watermark not matching the second watermark, not loading the software image.

13. The method of claim 12, wherein at least one of the first and second unused locations in the software image are overwritten when the software image is loaded and/or executed and wherein the first watermark comprises one or more of a forward hash of the software image, a reverse hash of the software image, a transparent bit code, and based on a record or pointer that determines that a layout of the software image has not changed.

14. The method of claim 12, wherein the first watermark is assigned based on a tenant basis in a cloud service based on one or more of a type of virtual machine, container, application, an administration, and a type of service provided by the software image.

15. The method of claim 12, wherein an order of the first and second unused locations is dynamically determined based on a random number and/or a number for the first and second unused locations is determined based on the random number.

16. The method of claim 15, wherein different portions of the random number and/or number map to the first and second unused locations and wherein the first watermark comprises one or more of: format, types of service, hash values of elements, hash values of configuration, size, layout index into a virtual environment, associated blocks, and block pointers.

17. The method of claim 12, wherein the different first and second watermark portions comprise two or more of: one or more hashes, one or more checksums, one or more cyclic redundancy checks, one or more random numbers, one or more encrypted hashes, one or more encrypted checksums, one or more encrypted cyclic redundancy checks, one or more transparent bit codes, and one or more tokens of one or more hashes.

18. The method of claim 12, wherein the first and second unused locations comprise at least one of: storage space that is marked as a bad block, a protected memory location, and space that is in a file structure as an added set of bits.

19. The method of claim 12, wherein the first and second unused locations comprise one or more of a memory location within the software image that is not used or not initially used by the software image and comprise an uninitialized location that is overwritten when the software image is loaded and/or executed, and wherein the first and second unused locations comprise one or more of white space of the software image, non-initialized data segment, stack space, heap space, and padding and wherein in response to receiving the request to load the software image further comprises at least one of:

validating a load sequence of the software image, wherein the first watermark is based on the load sequence of the software image;

hashing the software image to generate a first hash of the software image and comparing the first hash of the software image to the first watermark, wherein the first watermark is a second hash of the software image;

generating a first checksum and/or a first cyclic redundancy check of the software image and comparing the first checksum and/or the first cyclic redundancy check to the first watermark, wherein the first watermark is a second checksum of the software image and/or a second cyclic redundancy check of the software image;

looking up the first hash of the software image based on a token and comparing the first hash to a second hash of the software image, wherein the token is the first watermark;

determining an execution order of the software image and comparing the execution order of the software image to the first watermark, wherein the first watermark is based on the execution order of the software image;

determining locations of files used by the software image and comparing the locations of the files used by the software image to the first watermark, wherein the first watermark is based on the locations of the files used by the software image; and unsigning the first watermark, wherein the first watermark is signed using a digital signature.

20. A non-transient computer readable medium having stored thereon instructions that cause a processor to execute a method, the method comprising instructions to:

identify one or more unused locations in a software image;

determine, based on one or more rules, a specific type of watermark to be generated, the specific type of watermark comprising one or more of a forward hash of the software image, a reverse hash of the software image, a transparent bit code, and based on a record or pointer associated with a layout of the software image;

generate a first watermark based on at least part of the software image, the first watermark being the determined specific type of watermark;

store the first watermark in a separate location from the software image;

subdivide the first watermark into plural first watermark portions comprising different first and second watermark portions;

place the first watermark portion in a first unused location and the different second watermark portion in a different second unused location to produce a watermarked software image;

receive a request to load the watermarked software image;

in response to receiving the request to load the watermarked software image:

generate a second watermark using at least the first and second unused locations in the watermarked software image; and compare the first watermark stored in a separate location from the software image to the second watermark;

in response to the first watermark matching the second watermark, load the software image; and in response to the first watermark not matching the second watermark, not loading the software image.

\* \* \* \* \*